No. 614,264. Patented Nov. 15, 1898.
W. J. FLETCHER.
FRICTION CLUTCH PULLEY.
(Application filed May 7, 1897.)
(No Model.) 2 Sheets—Sheet 1.
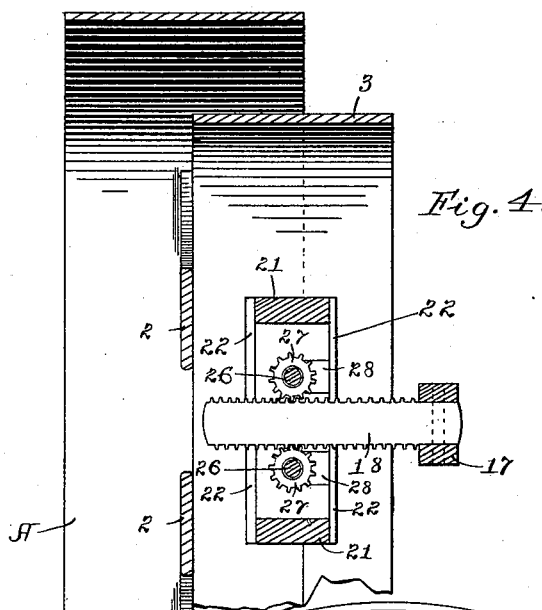
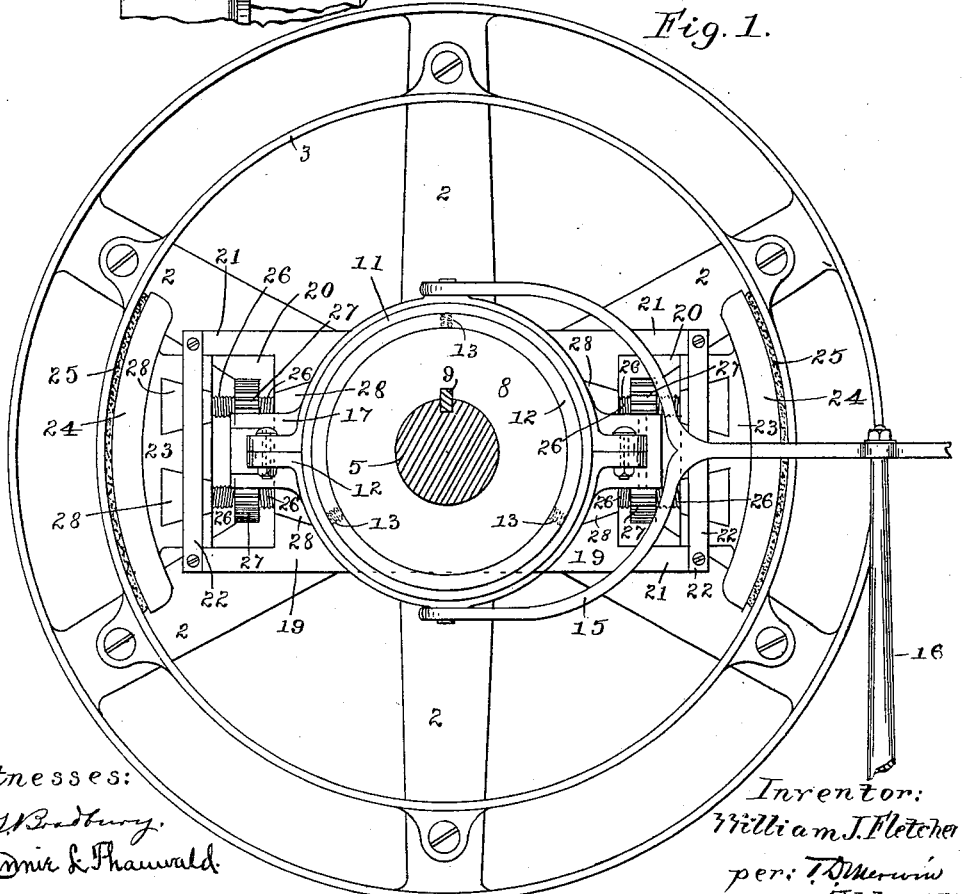
Witnesses:
F. L. Bradbury.
Hirnir L. Shauwald.
Inventor:
William J. Fletcher
per: T. D. Merwin
Attorney
THE NORRIS PETERS CO., PHOTO-LITHO., WASHINGTON, D. C.

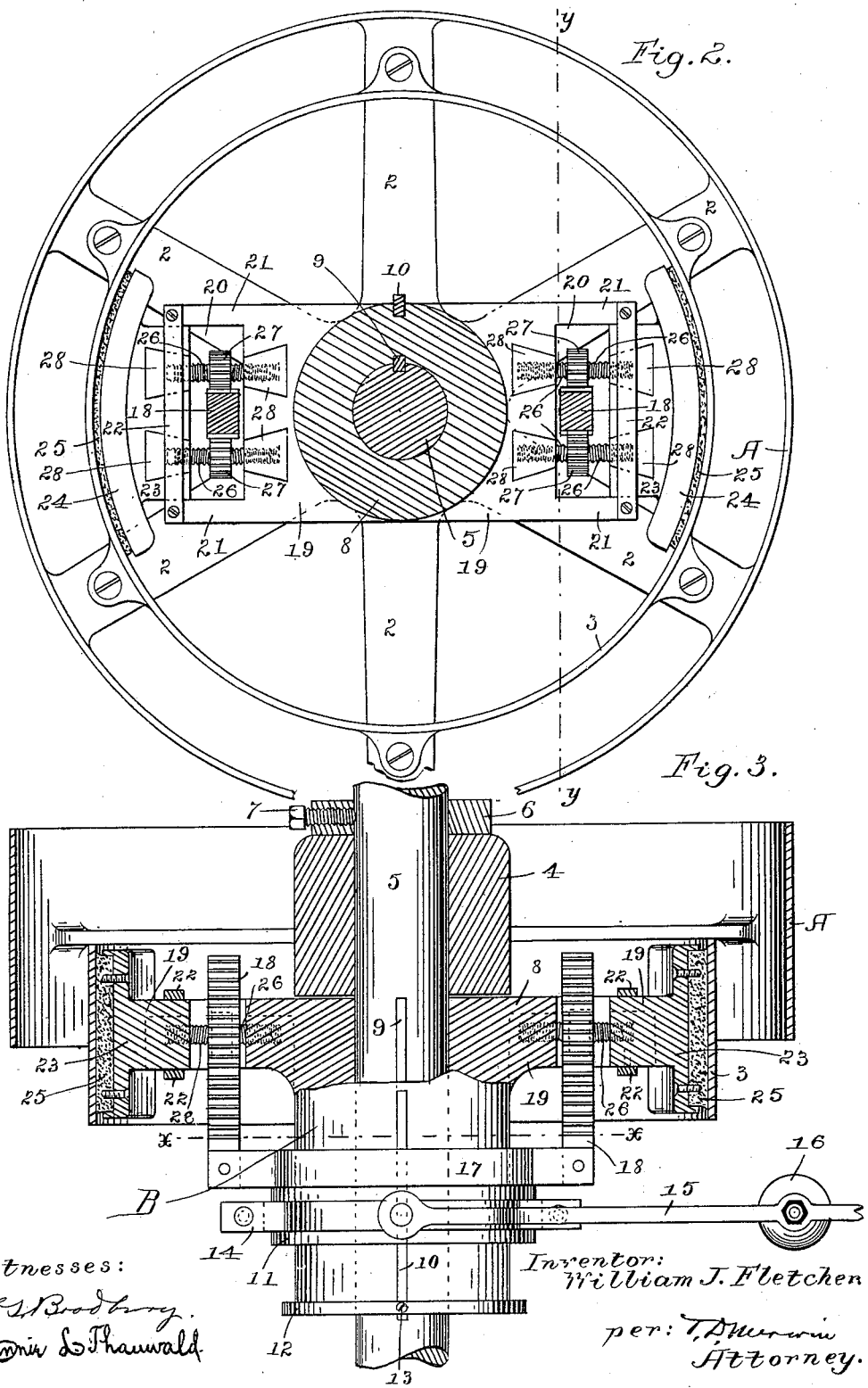

UNITED STATES PATENT OFFICE.

WILLIAM J. FLETCHER, OF ST. PAUL, MINNESOTA, ASSIGNOR OF ONE-HALF TO THE ROBERTS GOSS COMPANY, OF MINNESOTA.

FRICTION CLUTCH-PULLEY.

SPECIFICATION forming part of Letters Patent No. 614,264, dated November 15, 1898.

Application filed May 7, 1897. Serial No. 635,489. (No model.)

*To all whom it may concern:*

Be it known that I, WILLIAM J. FLETCHER, of St. Paul, Ramsey county, Minnesota, have invented certain Improvements in Friction Clutch-Pulleys, of which the following is a specification.

My invention relates to improvements in friction clutch-pulleys; and it consists in the features of construction hereinafter particularly described and claimed.

In the accompanying drawings, forming part of this specification, Figure 1 is an end elevation of a pulley shown with my improved friction clutch attachment. Fig. 2 is a similar view shown on line $x\ x$ of Fig. 3. Fig. 3 is a partial central longitudinal section, the rack-bars being shown in plan view; and Fig. 4 is a sectional detail taken on line $y\ y$ of Fig. 2.

In the drawings, A represents the pulley, which with its attachments constitutes the driven element, to the spokes 2 of which is bolted a rim or flange 3, concentric with the face of the pulley. The pulley has its hub 4 journaled loosely upon the shaft 5, being held from movement in one direction by the collar 6, secured on the shaft by the set-screw 7, and held from movement in the opposite direction by the hub 8 of the clutch mechanism B, secured upon the shaft by means of a key 9. Said clutch mechanism and its connected shaft constitute the driving element.

Slidable upon the hub 8 and held from turning thereon by means of the feather 10 is the sleeve 11. The outer end of the hub 9 has an annular ring 12, secured thereon by screws 13, thus constituting a flange which serves as a stop to limit the movement of the sleeve 11. This sleeve is slipped along the hub 8 by means of the two-part collar 14, working in a circumferential groove therein and operated by means of the yoke-shaped lever 15, having its fulcrum-pivot on the standard 16.

The sleeve 11 carries a fixed yoke or collar 17, to the laterally-projecting ends of which are secured double-faced rack-bars 18, projecting toward the pulley, as shown in Fig. 3. The clutch-hub has radial arms 19, the ends of each being cut away to form a rectangular recess 20, the projecting portions 21 being connected by cross-bars 22 on each side thereof. Working between the cross-bars 22 and parts 21 as guides is the shoe block or carrier 23, having a shoe 24, provided with a suitable facing of wood or other material 25 and adapted to bear upon the inner face of the flange 3. Between the inner ends of the blocks 23 and the bottoms of the recesses 20 are arranged two right-and-left-threaded screws 26, having pinions 27, so positioned as to mesh with the teeth of the interposed rack-bar. These screws are threaded into dovetailed blocks 28, which are set into the adjacent faces of the carriers 23 and arms 19, as shown best in Fig. 1. The parts are so arranged that when the sleeve is thrust inward by means of the lever 15 the rack-bars turn the screws so as to thrust the shoe-carriers outward, causing the shoes to make contact with the flange 3 and clutch the same and thereby operate the pulley.

I claim—

1. In a friction-clutch, in combination with the cylindrical flange, the radial arms, and the carriers working upon said arms, the removable dovetailed blocks in both carriers and arms, the pair of screws for each carrier threaded into the blocks of the carrier and arm, the pinions upon said screws, the double-faced rack engaging both pinions, and the frame-guide for each carrier, substantially as and for the purposes set forth.

2. In a friction-clutch, in combination with the cylindrical flange 3, the radial arms 19, and the shoe-carriers 23, the side bars 21, and cross-bars 22, upon the arms 19 serving as guides for said carriers, the removable dovetailed blocks in both carriers and arms, the reverse screws threaded in the opposed blocks, the pinions upon said screws and the double rack working between and actuating each pair of pinions, as and for the purposes specified.

In testimony whereof I affix my signature in presence of two witnesses.

WILLIAM J. FLETCHER.

Witnesses:
T. D. MERWIN,
MINNIE L. THAUWALD.